United States Patent [19]

Shiba et al.

[11] Patent Number: 5,317,936
[45] Date of Patent: Jun. 7, 1994

[54] POWER TRANSMISSION STRUCTURE OF A WORKING CAR

[75] Inventors: Kenji Shiba; Hideaki Okada, both of Amagasaki, Japan

[73] Assignee: Kanzaki Kokyukoki Mfg. Co. Ltd., Hyogo, Japan

[21] Appl. No.: 946,579

[22] Filed: Sep. 18, 1992

[30] Foreign Application Priority Data

Sep. 19, 1991 [JP] Japan ................... 3-239835

[51] Int. Cl.⁵ ........................... F16H 37/06
[52] U.S. Cl. ................... 74/606 R; 475/83; 60/487
[58] Field of Search ........... 74/606 R; 475/72, 83, 475/198, 200, 210; 60/485, 487, 489; 180/307, 53.1, 53.4, 53.6, 53.61, 53.62, 53.7

[56] References Cited

U.S. PATENT DOCUMENTS

| | | | |
|---|---|---|---|
| 3,047,085 | 7/1962 | Kieffer et al. | 180/70 |
| 4,304,141 | 12/1981 | Tone et al. | 74/606 R |
| 4,498,349 | 2/1985 | Nishihara | 74/5.2 |
| 4,658,662 | 4/1987 | Rundle | 74/331 |
| 4,727,759 | 3/1988 | Yamaoka et al. | 74/15.2 |
| 4,784,013 | 11/1988 | Yamaoka et al. | 74/606 R |
| 4,809,489 | 3/1989 | Johansson | 180/235 |
| 4,856,368 | 8/1989 | Fujisaki et al. | 74/606 R |
| 4,867,008 | 9/1989 | Yamaoka et al. | 74/606 R |
| 4,870,820 | 10/1989 | Nemoto | 60/487 |
| 4,870,820 | 10/1989 | Nemoto | 180/307 |
| 4,882,940 | 11/1989 | Yamaoka et al. | 74/15.6 |
| 4,891,943 | 1/1990 | Okada | 60/487 X |
| 4,893,524 | 1/1990 | Ohashi et al. | 60/487 X |
| 4,922,787 | 5/1990 | Fujisaki et al. | 74/606 R X |
| 4,932,209 | 6/1990 | Okada et al. | 60/487 |
| 4,942,780 | 7/1990 | Fujisaki et al. | 74/606 R X |
| 4,986,073 | 1/1991 | Okada | 60/487 X |
| 5,031,403 | 7/1991 | Okada | 74/606 R X |
| 5,090,949 | 2/1992 | Thoma et al. | 475/200 X |
| 5,146,748 | 9/1992 | Okada | 74/606 R X |
| 5,156,576 | 10/1992 | Johnson | 74/606 R X |
| 5,163,293 | 11/1992 | Azuma et al. | 60/487 |
| 5,211,077 | 5/1993 | Louis et al. | 74/606 R |
| 5,230,519 | 7/1993 | Nishimura et al. | 475/83 |

FOREIGN PATENT DOCUMENTS 1-223023  9/1989  Japan.
1-309821 12/1989  Japan.

Primary Examiner—Leslie A. Braun
Assistant Examiner—Ryan W. Massey
Attorney, Agent, or Firm—Sterne, Kessler, Goldstein & Fox

[57] ABSTRACT

A power transmission structure for a working car provided at the center thereof with a working machine, such as a mower. Power is transmitted by the simplest mechanism from a vertical engine to axles and the working machine. Two output pulleys are attached to a vertical rotary output shaft of the vertical engine. One pulley drives a pump shaft of an axle driving unit and the other pulley drives an input pulley of the working machine. A hydraulic power transmission and a differential gear are laterally eccentrically disposed within the axle driving unit. The hydraulic transmission comprises a hydraulic pump and a hydraulic motor. Power is transmitted from the rotary output shaft of the vertical engine to a vertical pump shaft of the hydraulic pump. A motor shaft of the hydraulic motor is operatively connected to the differential gear.

25 Claims, 11 Drawing Sheets 5,317,936

POWER TRANSMISSION STRUCTURE OF A WORKING CAR

FIELD OF THE INVENTION

The present invention relates to a power transmission structure for transmitting power from a vertical engine to an axle driving unit and a working machine on board a working car.

BACKGROUND OF THE INVENTION

The conventional technique with regard to the axle driving unit housing therein a hydraulic transmission has been well known as disclosed in, for example, the Japanese Patent Laid-Open No. Hei 1-223023 and No. Hei 1-309821. The power transmission structure of a working vehicle, as disclosed in U.S. Pat. No. 4,809,489 and U.S. Pat. No. 3,047,085, is also well known.

SUMMARY OF THE INVENTION

The present invention relates to a mechanism for transmitting power from an engine by the simplest structure on a working car which includes a working machine, such as a mower.

BRIEF DESCRIPTION OF THE DRAWINGS

Various objects, features, and advantages of the present invention will be more fully appreciated as the same becomes better understood from the following detailed description of the present invention when considered in connection with the accompanying drawings, in which.

DESCRIPTION OF THE PREFERRED EMBODIMENT

Figure 1:
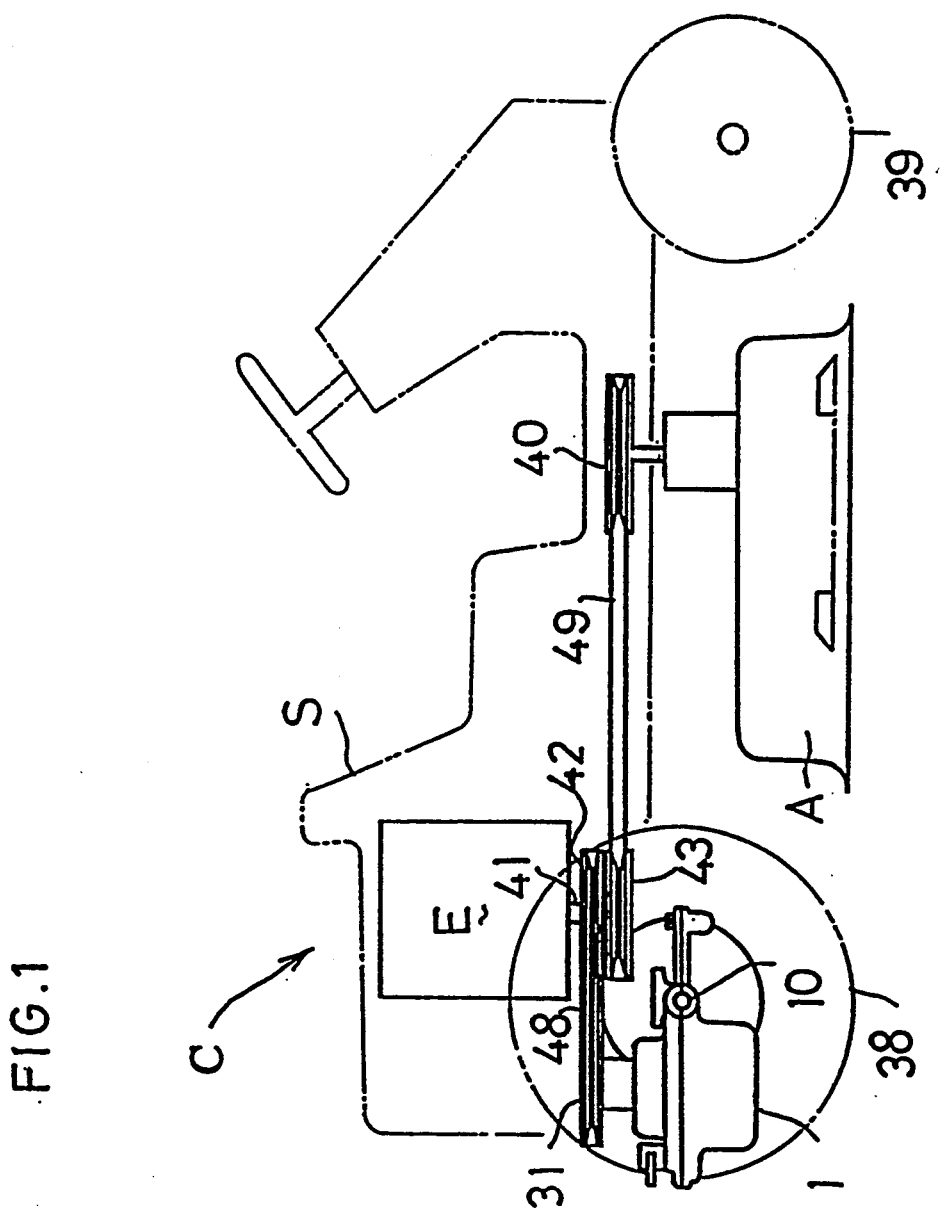
FIG. 1 is a side view of a working car loading thereon an axle driving unit and a working machine A.
Figure 2:
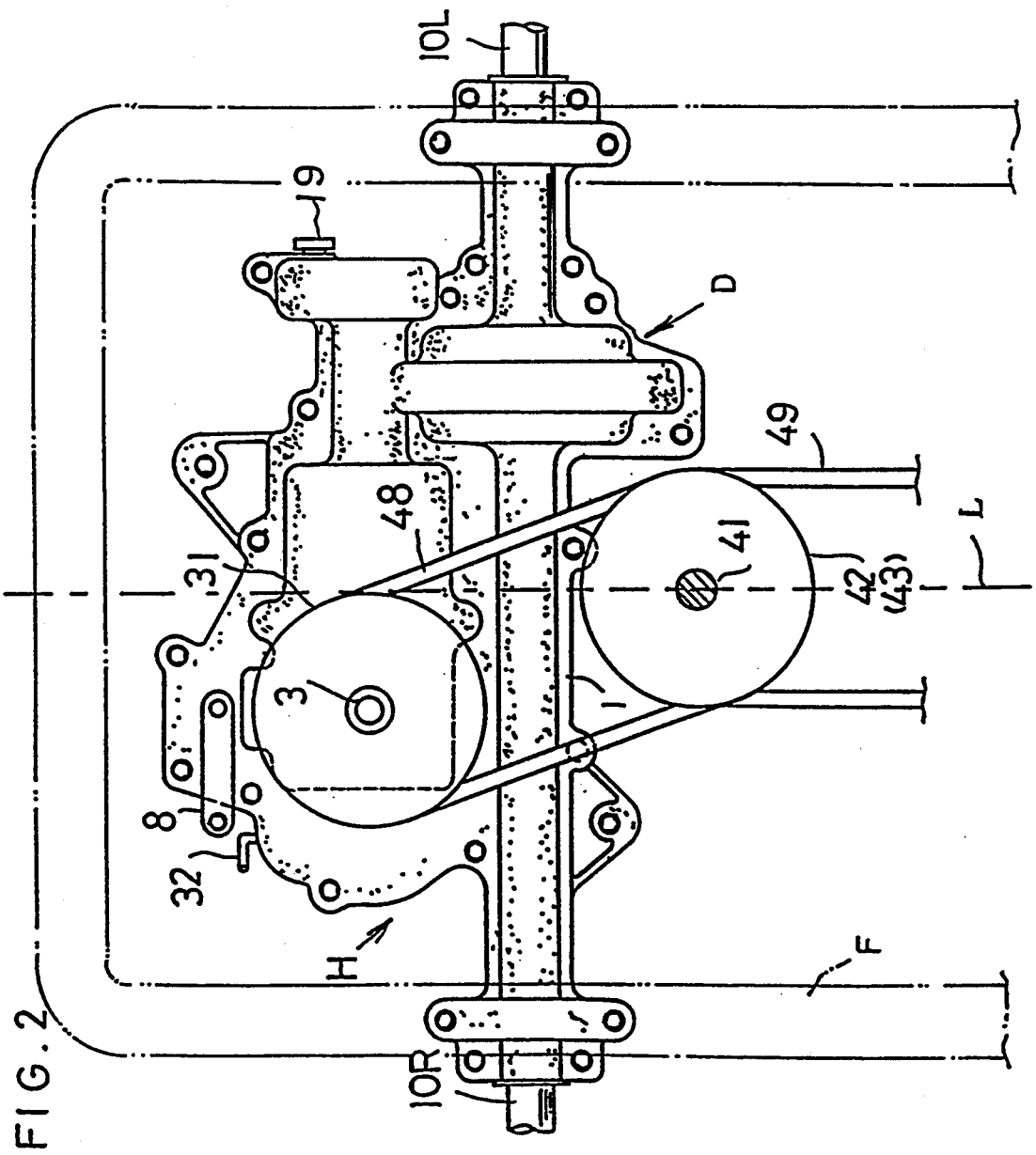
FIG. 2 plan view of the axle driving unit.

In FIG. 1, a working car or other vehicle C is shown which includes an axle driving unit and a working machine A, or other driven apparatus such as a mower. The working car is supported by two front wheels 39 and two rear wheels 38. As shown in FIG. 2, the axle driving unit is provided with a hydraulic transmission H to drive the rear wheels 38 by axles 10L and 10R. An engine E is vertically positioned at the rear of seat S of the working car C, and substantially at the lateral or widthwise center of the car body. That is, vertical engine E is located along a central longitudinal axis of the car body, depicted in FIG. 2 as imaginary line L, which is perpendicular to the axles 10L and 10R. A rotary output shaft 41 projects downwardly, perpendicular to engine E. Output pulleys 42 and 43 are fixed to the rotary output shaft 41. A belt 48 is wound around the output pulley 42 so as to rotate, through an input pulley 31, a pump shaft 3 of a hydraulic pump in the hydraulic transmission H. A belt 49 is wound around the output pulley 43 to rotate an input pulley 40.

Figure 5:
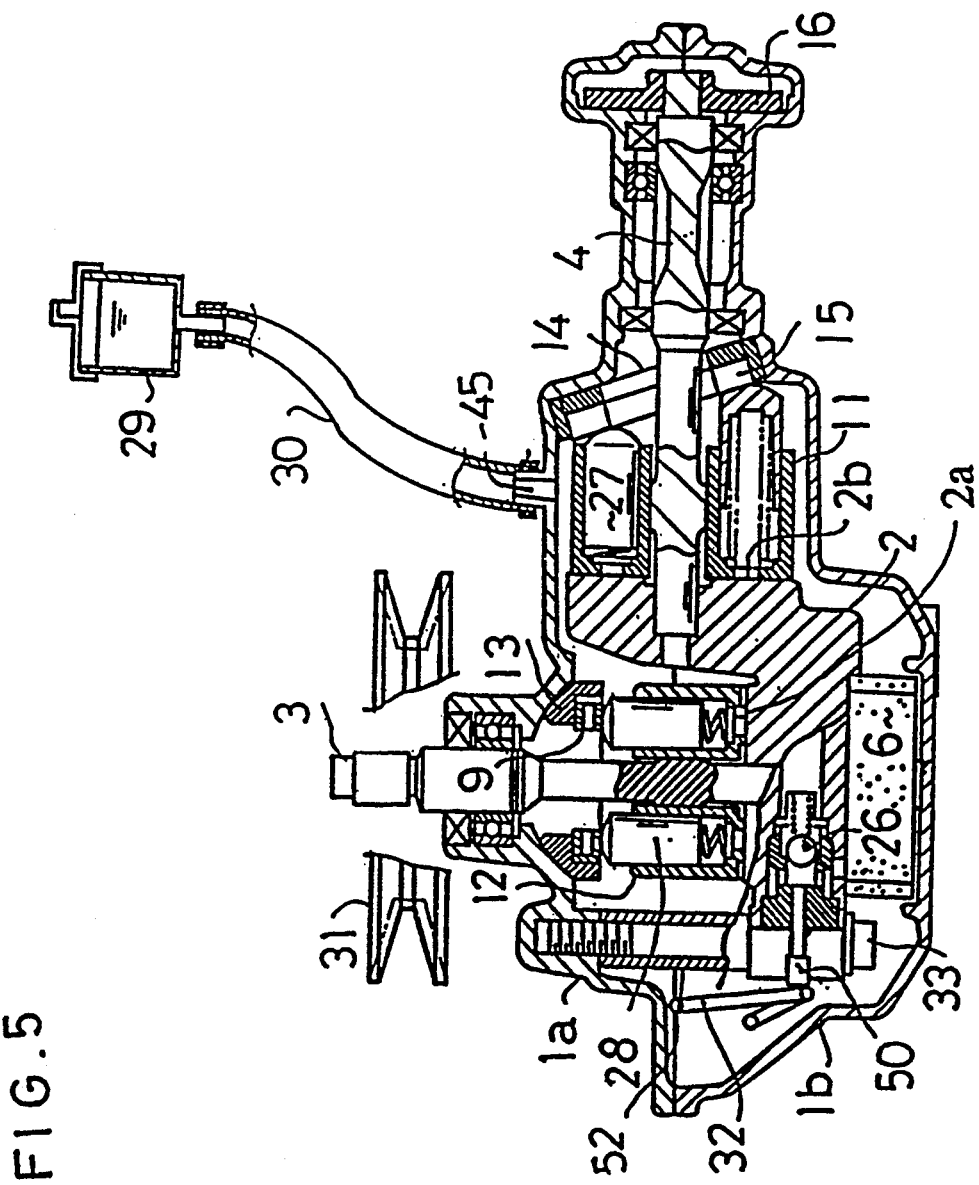
FIG. 5 is a sectional rear view of the axle driving unit on the axis of a motor shaft 4.

The axle driving unit shown in FIG. 2 comprises an axle casing 1, a hydraulic transmission H, a differential gear D, and axles 10L and 10R. The vertical engine E is positioned at the rear of the working car and at substantially the lateral or widthwise center. The hydraulic transmission H is housed within the axle casing 1, and is disposed at the rear of the axles. At the front side of the axles is disposed the rotary output shaft 41, to which the output pulleys 42 and 43 are fixed. The belt 48 is wound around the output pulley 42 at the rotary output shaft 41, and wound around an input pulley 31 at the pump shaft 3. The belt 49 is wound around the output pulley 43, and wound around the input pulley 40 at the front of working car C. Reference numeral 8 designates a speed change lever for rotating a movable swash plate 9 at the hydraulic pump (FIG. 5).

Figure 4:
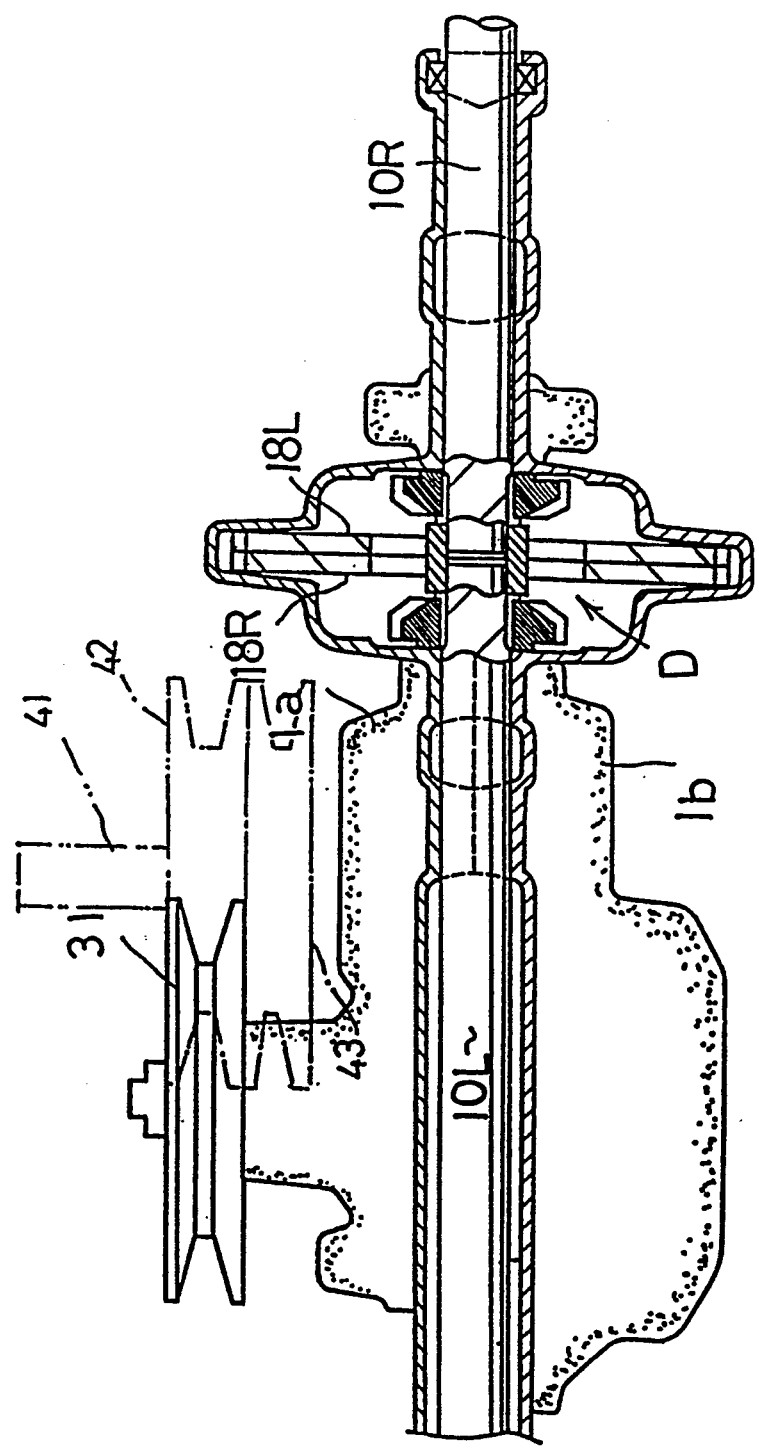
FIG. 4 is a sectional rear view of the axle driving unit on the axes of axles 10L and 10R.

In the axle casing 1, the axis of a motor shaft 4 of the hydraulic transmission and the axes of the axles 10L and 10R are disposed in the same plane. The axle casing 1 is divided into an upper half casing 1a and a lower half casing 1b through a flat junction in that plane. As shown in FIG. 4, the portion of the casing which houses the differential gear D extends or vertically projects from the portion of the casing housing the axles.

As shown in FIG. 2, the rotary output shaft 41 of the vertical engine E is disposed at substantially the lateral center, that is, along a central longitudinal axis of the vehicle, depicted as imaginary line L. The pump shaft 3 projecting from the axle casing 1 is disposed on one side of imaginary line L and the differential gear D disposed in the axle casing 1 is disposed on the laterally opposite side of imaginary line L. The pump shaft 3 and differential gear D are drivably connected through the hydraulic transmission H and motor shaft 4.

Figure 3:
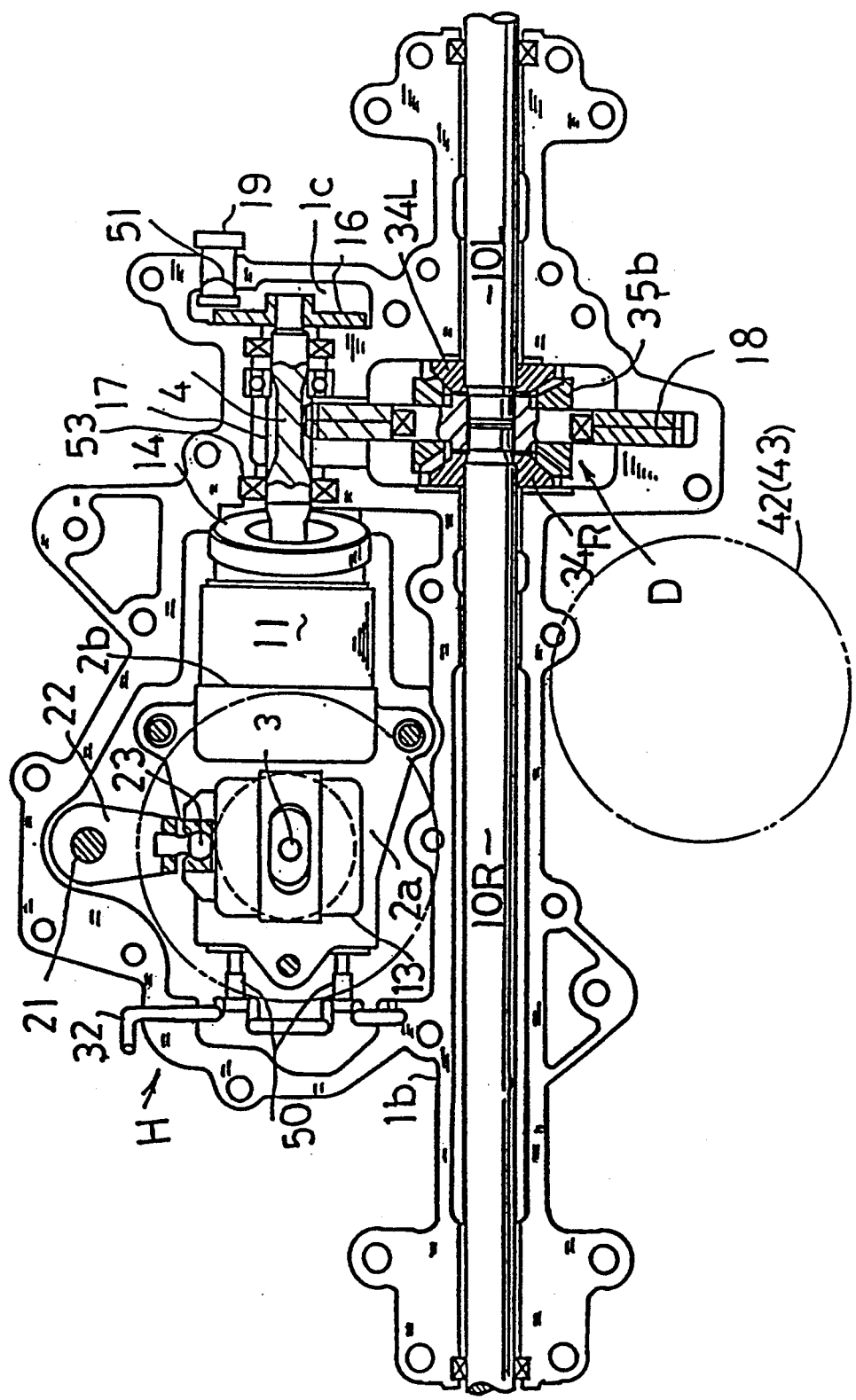
FIG. 3 is a plan view of an axle casing 1 from which an upper half casing 1a is removed.

In FIG. 3, the upper half casing 1a is removed to show the interior of axle casing 1. In the axle casing 1 is disposed a center section 2. The center section 2 is jointed to the lower surface of the upper half casing 1a at the junction surfaces of the upper half casing 1a and lower half casing 1b. A pump cylinder 12 is rotatably mounted on a pump mounting surface 2a constructed at the horizontal surface of the center section 2. A motor cylinder 11 is rotatably mounted on a motor mounting surface 2b constructed on the vertical surface of the center section 2.

Figure 6:
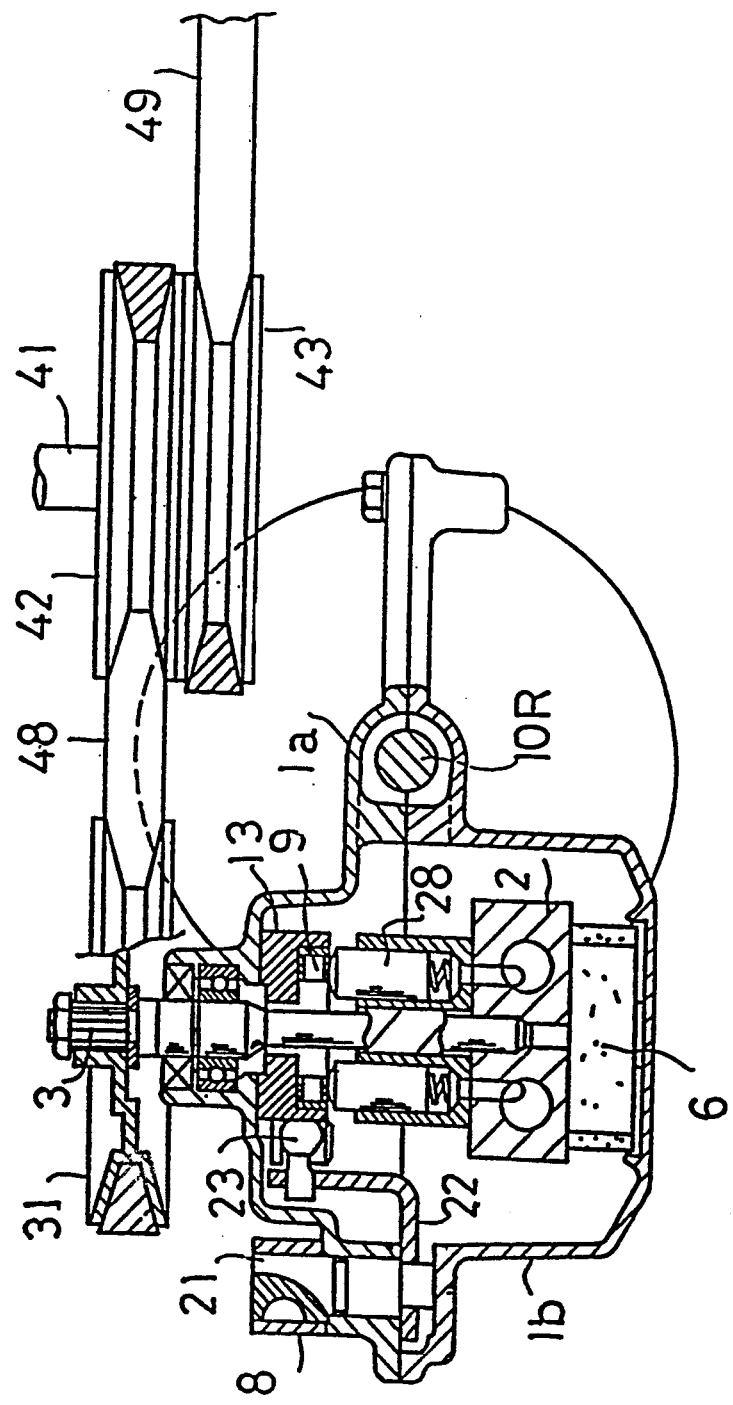
FIG. 6 is a sectional side view on the axis of a pump shaft 3.

In this embodiment, the motor cylinder 11 is larger in diameter than the pump cylinder 12. In other words, the hydraulic motor is larger in capacity than the hydraulic pump so that the motor shaft 4 is hydraulically reduced in rotation speed. As shown in FIG. 6, a speed change lever 21 rotates through a speed change lever 8 to rotate a movable swash plate 9, together with a rotary swash plate casing 13. Speed change lever 8 operates through a swash plate rotating arm 22 and a swash plate rotating projection 23.

As shown in FIG. 3, the axle casing 1 is partitioned by an oil seal 53 into a first chamber for housing the hydraulic transmission, comprising the hydraulic pump and hydraulic motor, and a second chamber housing therein an output transmitting member 17, the differential gear D, and axles 10L and 10R. The first chamber is filled with operating oil for driving the hydraulic transmission, and the second chamber is filled with grease for lubrication.

As shown in FIG. 5, within the center section 2 is disposed a check valve 26 for supplying additional operating oil into the closed circuit. An open rod 50 is provided for opening the check valve 26 to short-circuit a high pressure oil passage and a low pressure oil passage in the closed circuit, thereby cutting off the output of the hydraulic motor. A closed circuit short-circuiting lever 32 biases the open rod 50 so that, when the lever 32 is not operated, the open rod 50 is pushed backwardly, whereby the check valve 26 is closed. In this state, the closed circuit is not short-circuited and the hydraulic motor is driven by discharged oil from the hydraulic pump.

The hydraulic transmission H of the present invention comprises a hydraulic pump and hydraulic motor. The rotation of the hydraulic motor, comprised of a motor cylinder 11, is transmitted from the motor shaft 4 to the output transmitting member 17, which engages with a ring gear 18 at the differential gear D. An outer end of the motor shaft 4 projects into a brake chamber 1c, disposed between the upper half casing 1a and the lower half casing 1b. A single plate disc 16 is fixed to the utmost end of motor shaft 4.

Figure 12:
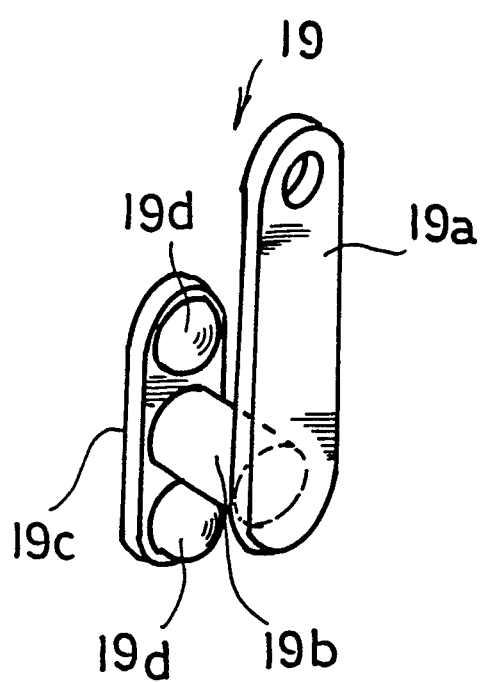
FIG. 12 is a perspective view of a brake actuator 19.

A brake actuator 19, as shown in FIG. 12, is integrally formed of an arm 19a, a brake shaft 19b, a brake plate 19c, and a cam member 19d by use of sintered metal material. The brake shaft 19b is rotatably and slidably sandwiched between the junction surfaces of the upper half casing 1a and lower half casing 1b. The brake plate 19c is provided at the rear surface, opposite to the single plate disc 16. The cam 19d abuts against a cam face 51 formed at the inner wall of brake chamber 1c.

When the arm 19a is manually operated to rotate the brake shaft 19b, the cam member 19d rides on a shallow portion from a deep portion of the cam surface 51. The entire brake actuator 19 moves toward the single plate disc 16, and the brake plate 19c biases the single plate disc 16, thereby enabling the motor shaft 4 to be braked.

The ring gear 18, constituting the differential gear D, is comprised of a plurality of overlapping gears. In one embodiment, two ring gears 18L and 18R are formed in layers to facilitate assembly.

Figure 8:
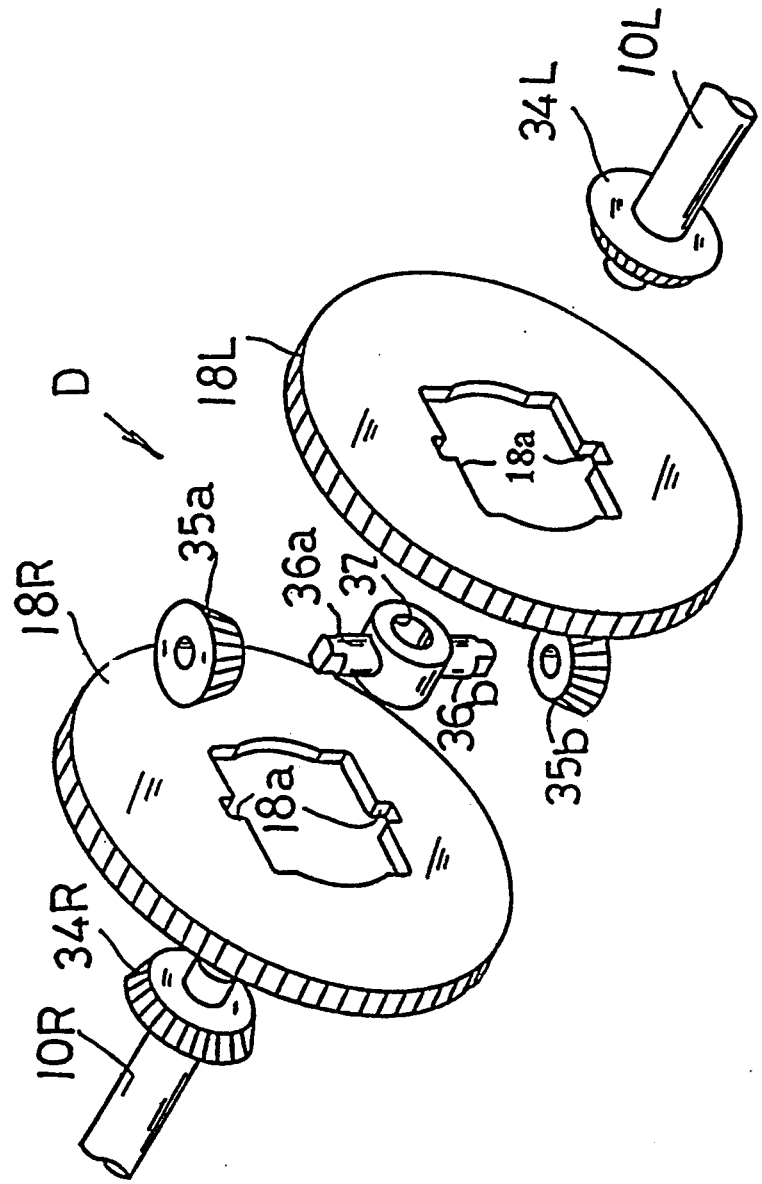
FIG. 8 is a perspective exploded view of a differential gear D.

Explanation will now be given on the differential gear D in FIGS. 4 and 8. At the center of two ring gears 18R and 18L are open retaining bores 18a for pinion pins 36a and 36b, which are fitted therein and rotate together therewith. Pinions 35a and 35b are freely fitted onto the pinion pins 36a and 36b, and engage with differential side gears 34L and 34R, respectively. Inner end projections of axles 10L and 10R are freely and rotatably fitted into a free rotation cylinder 37 integral with the center between the pinion pins 36a and 36b.

Axle casing 1 is dividable in the axial direction into an upper half casing 1a and lower half casing 1b. A pair of axles 10L and 10R, disposed within axle casing 1, are connected with the differential gear D. The ring gear 18 of differential gear D is formed of single gears 18L and 18R which are small in thickness and axially overlap each other. Gears 18L and 18R are provided with retaining bores 18a which are flat at the side surfaces so that the pinion pins 36a and 36b are retained in the upper and lower slit portions, respectively, of the retaining bores 18a. As shown in FIG. 4, the ring gears 18L and 18R are inserted into recesses formed in the upper half casing 1a and lower half casing 1b. Gears 18L and 18R abut against each other.

Therefore, since the ring gears 18L and 18R can be subjected to press working, the working cost can be reduced, and a casing for the differential gear is not required. Each ring gear 18 itself is laterally locked by the recess in the axle casing 1, the recess requires no tightening tool, such as a rivet, and can maintain ring gears 18L and 18R in an overlapping configuration.

Next, explanation will be given on the construction in FIG. 5, in which the pump mounting surface 2a provided at the center section 2 is disposed lower than the junction surface between the upper half casing 1a and the lower half casing 1b, and fixed in the lower position through an interposed washer 52. Thus, the pump mounting surface 2a is put in a low position so as to enable the pump shaft 3 to be lower. Consequently, input pulley 31 is lower, whereby the axle driving unit itself can be disposed in a high position. The pump mounting surface 2a of center section 2 is fixed to the lower surface of the upper half casing 1a through the washer 52, whereby it is advantageous that a rotary and slide surface of the pump cylinder 12 at the pump mounting surface 2a is easy to machine.

Pump pistons 28 are freely fitted into a pump cylinder 12 mounted on the pump mounting surface 2a. The pump pistons 28, while abutting against the slanted swash plate 9, move in reciprocation so as to feed pressure oil to the hydraulic motor. Motor pistons 27 are fitted into the motor cylinder 11. The pistons are biased by the pressure oil from the hydraulic pump to be brought into press contact with a fixed swash plate 15, thereby rotating the motor cylinder 11 and motor shaft 4. Reference numeral 14 designates a fixed swash plate casing.

An oil filter 6 is disposed between the center section 2 and the inner surface of the bottom of lower half casing 1b. Operating oil having passed through the oil filter 6 is supplied to the closed circuit in the center section 2 through the check valve 26.

FIG. 6 shows output pulleys 42 and 43 fixed to the lower end of the rotary output shaft 41. Output pulley 42, for transmitting power to the axle driving unit, is disposed above output pulley 43 for transmitting power to the working machine A. A speed change lever shaft 21, fixed to the speed change lever 8, abuts at its lower end against the inner surface of lower half casing 1b to act as a lock for preventing the swash plate rotation arm 22, swash plate rotation projection 23, and speed change lever shaft 21 from traveling downwards.

Figure 7:
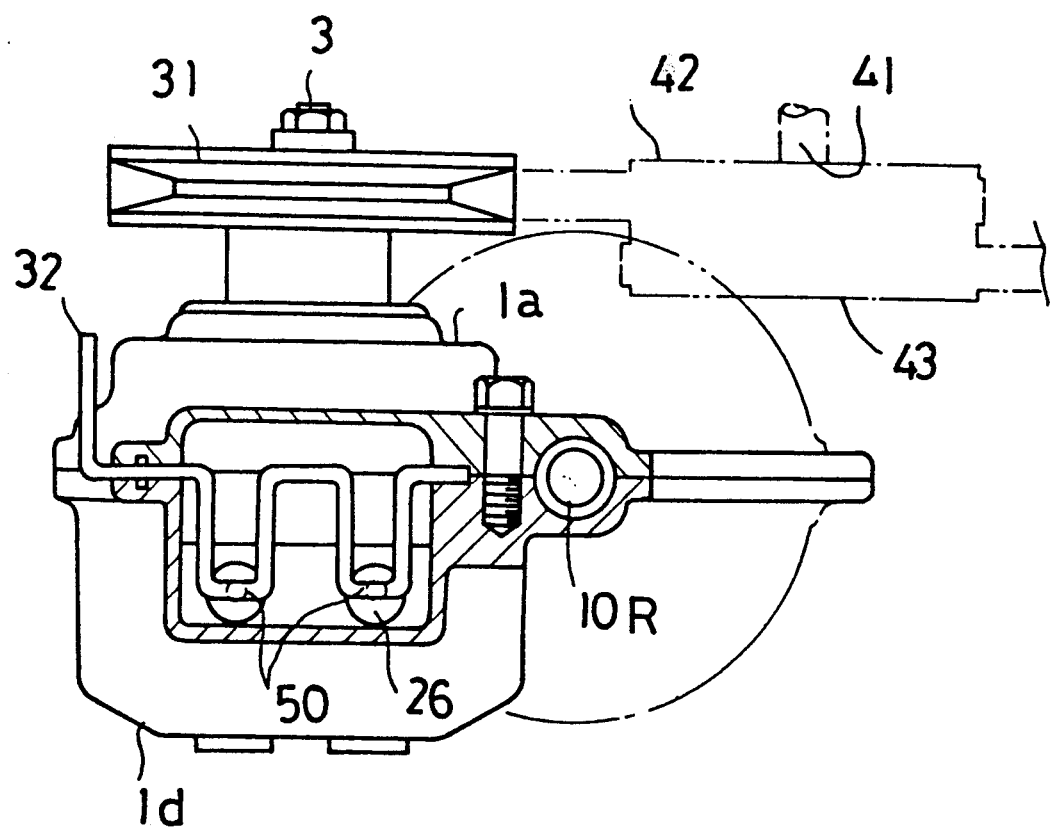
FIG. 7 is a sectional side view on the axis of a closed circuit short-circuiting lever.

FIG. 7 shows the structure of the closed circuit short-circuiting lever 32, in which the open rods 50 abut against the check valves 26 provided in the bores formed at the center section 2. Both the open rods 50 are biased by the closed circuit short-circuiting lever 32 to open the check valves 26. The closed circuit short-circuiting lever 32 is formed of a spring steel bar bent in an M-like shape, thereby requiring no extra shafts or arms in use. The closed circuit short-circuiting lever 32 is journalled at the junction surfaces between the upper half casing 1a and the lower half casing 1b.

As shown in FIG. 5, in the first chamber of axle casing 1, a reservoir tank 29 is provided in anticipation of volume expansion of operating oil stored in the first chamber. The operating oil passes between the axle casing 1 and reservoir tank 29 through a connecting pipe 30.

Figure 9:
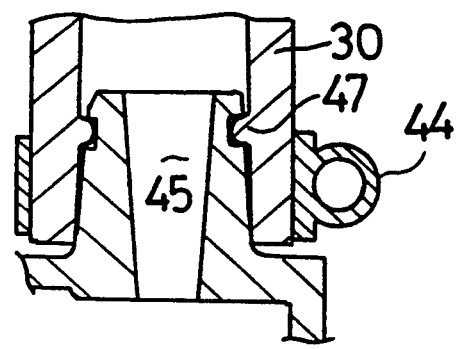
FIG. 9 is a sectional view of a coupling portion of a connecting pipe 30 with a reservoir tank 29.
Figure 10:
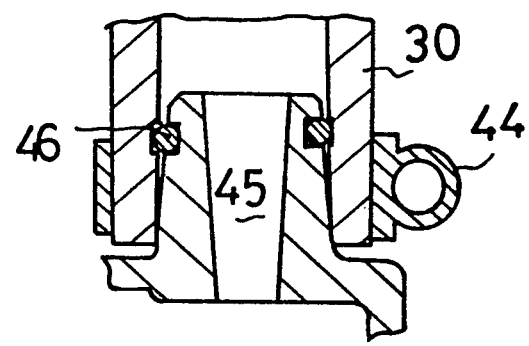
FIG. 10 is a sectional side view of a modified embodiment of the coupling portion of the connecting pipe 30.
Figure 11:
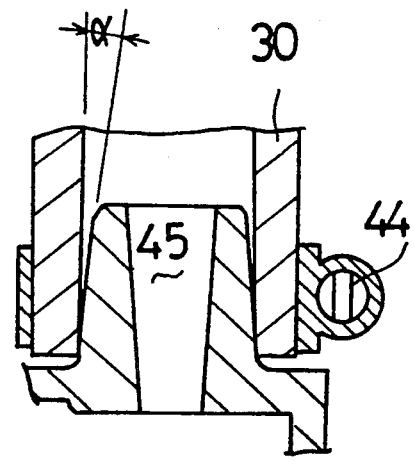
FIG. 11 is a sectional side view of the conventional coupling portion at the connecting pipe 30.

FIGS. 9, 10 and 11 show a coupling of the connecting pipe 30 with the reservoir tank 29, in which the upper half casing 1a and lower half casing 1b are cast-molded by a die-cast method. Therefore, a draft a of die-casting, as shown in FIG. 11, is attached to a pipe mounting joint 45 formed integrally with the upper half casing 1a and for connecting the connecting pipe 30. The connecting pipe 30, even when tightened by a hose clamp 44, will gradually escape from the joint.

In the structure of the present invention, as shown in FIGS. 10 or 9, at the outer periphery of the pipe mounting joint 45 is formed an annular groove in which a snap ring 46 is inserted for locking, or into which a fitting projection 47 is provided. The snap ring 46 or fitting projection 47 forms a catching portion, thereby preventing the connecting pipe 30 from escaping from the pipe mounting joint 45.

The power transmission structure of the present invention makes it possible to lower the center of gravity of the vertical engine E of the working car, thereby improving the running stability of the working car. Also, the vertical engine E and the axle driving unit can be vertically close to each other, thereby enabling the car body to be miniaturized.

When viewed laterally, the vertical engine E can be disposed in front of the differential gear D, and the hydraulic transmission H at the rear of the differential gear D. The transmission is thus separated from the engine, to prevent it from being affected by heat radiating from the engine. Output pulleys 42 and 43 are located above the differential gear D. Since the output pulley 43 of the vertical engine E and the input pulley 40 of the working machine A can be located in an approximately horizontal plane, the power transmitting system from the vertical engine to the working machine A can be simplified.

What is claimed is:

1. A power transmission for a vehicle, comprising:
   an axle casing;
   an axle disposed within said axle casing;
   an engine having a vertical output shaft, said vertical output shaft disposed perpendicular to a central longitudinal axis of said vehicle;
   a hydraulic transmission disposed within said axle casing and operatively connected to said axle through a differential gear, said hydraulic transmission including a pump shaft parallel to said vertical output shaft, said differential gear disposed on one side of said axis and said pump shaft disposed on a side of said axis opposite said one side;
   first and second output pulleys drivingly connected to said vertical output shaft;
   a transmission input pulley drivingly connected to said pump shaft;
   a belt drivingly engaged with said first output pulley and said transmission input pulley so that said first output pulley drives said transmission input pulley;
   a driven apparatus attached to said vehicle;
   a driven apparatus input pulley drivingly connected to said driven apparatus;
   a belt drivingly engaged with said second output pulley and said driven apparatus input pulley so that said second output pulley drives said driven apparatus input pulley;
   wherein said axle casing includes a portion for housing said differential gear which extends from a portion for housing said axle; and
   wherein said first and second output pulleys are disposed to one side and above said portion for housing said differential gear.

2. A power transmission for a vehicle, comprising:
   an axle casing;
   an axle disposed within said axle casing;
   an engine having an output shaft;
   a hydraulic transmission disposed within said axle casing and operatively connected to said axle through a differential gear, said hydraulic transmission including a pump shaft parallel to said output shaft;
   wherein said engine is disposed on the same transverse half of said vehicle as said hydraulic transmission;
   a first output pulley drivingly connected to said pump shaft;
   a transmission input pulley drivingly connected to said pump shaft; and
   a belt drivingly engaged with said first output pulley and said transmission input pulley so that said first output pulley drives said transmission input pulley.

3. A power transmission according to claim 2, wherein:
   said axle casing includes a portion for housing said differential gear which extends from a portion for housing said axle; and
   said first output pulley is disposed to one side and above said portion for housing said differential gear.

4. A power transmission according to claim 2, further comprising:
   a driven apparatus attached to said vehicle;
   a second output pulley drivingly connected to said output shaft;
   a driven apparatus input pulley drivingly connected to said driven apparatus; and
   a belt drivingly engaged with said second output pulley and said driven apparatus input pulley so that said second output pulley drives said driven apparatus input pulley.

5. A power transmission according to claim 4, wherein said second output pulley and said driven apparatus input pulley are located in an approximately horizontal plane.

6. A power transmission according to claim 4, wherein:
   said axle casing includes a portion for housing said differential gear which extends from a potion for housing said axle; and
   said first and said second output pulleys are disposed to one side and above said portion for housing said differential gear.

7. A power transmission according to claim 2, wherein:
   said output shaft is vertically disposed and perpendicular to a central longitudinal axis of said vehicle; and
   said differential gear is disposed on one side of said axis and said pump shaft is disposed on a side of said axis opposite said one side.

8. A power transmission according to claim 7, wherein:

said axle casing includes a portion for housing said differential gear which extends from a portion for housing said axle; and said first output pulley is disposed to one side and above said portion for housing said differential gear.

9. A power transmission according to claim 7, further comprising:
a driven apparatus attached to said vehicle;
a second output pulley drivingly connected to said vertical output shaft;
a driven apparatus input pulley drivingly connected to said driven apparatus; and
a belt drivingly engaged with said second output pulley and said driven apparatus input pulley so that said second output pulley drives said driven apparatus input pulley.

10. A power transmission according to claim 9, wherein said second output pulley and said driven apparatus input pulley are located in an approximately horizontal plane.

11. A power transmission according to claim 7, wherein:
said axle casing includes a portion for housing said differential gear which extends from a potion for housing said axle; and
said first and said second output pulleys are disposed to one side and above said portion for housing said differential gear.

12. A power transmission according to claim 2, wherein said engine is disposed to one side of a vertical plane through said axles, and said hydraulic transmission is disposed to an other side of said plane.

13. A power transmission according to claim 12, wherein:
said hydraulic transmission comprises a hydraulic pump hydraulically connected to a hydraulic motor within said axle casing; and
said hydraulic pump and said hydraulic motor are arranged adjacent to said axles in said axle casing.

14. A power transmission according to claim 13, wherein said hydraulic motor further comprises:
a motor shaft; and
means for directly connecting said motor shaft with said differential gear;
wherein said hydraulic motor has a larger capacity than said hydraulic pump.

15. A power transmission according to claim 12, wherein said axle casing further comprises:
a chamber for housing said hydraulic transmission, substantially filled with oil; and
means for accommodating expansion in the volume of said oil.

16. A power transmission for a vehicle, comprising:
an engine with a vertical output shaft, said engine disposed between a pair of rear wheels, and said vertical output shaft projecting below said engine;
a hydraulic transmission for driving said rear wheels disposed to the rear of said engine;
a first output pulley drivingly connected to said vertical output shaft;
a transmission input pulley disposed above said hydraulic transmission and drivingly connected thereto; and
a belt drivingly engaged with said first output pulley and said transmission input pulley so that said first output pulley drives said transmission input pulley.

17. A power transmission according to claim 16, further comprising:
an axle casing disposed below and to the rear of said engine; and
a pair of axles disposed within said axle casing on which said rear wheels are mounted;
wherein said axles are driven by said hydraulic transmission.

18. A power transmission according to claim 17, wherein:
said hydraulic transmission comprises a hydraulic pump hydraulically connected to a hydraulic motor within said axle casing; and
said hydraulic pump and said hydraulic motor are arranged adjacent to said axles in said axle casing.

19. A power transmission according to claim 18, further comprising:
a motor shaft of said hydraulic motor; and
means to directly connect said motor shaft to a differential gear for differentially driving said axles;
wherein said hydraulic motor has a larger capacity than said hydraulic pump.

20. A power transmission according to claim 17, further comprising:
a chamber disposed within said axle casing for housing said hydraulic transmission, wherein said chamber is filled with oil;
means for accommodating expansion in the volume of said oil.

21. A power transmission for a vehicle, comprising:
a working device disposed between a pair of front wheels and a pair of rear wheels;
an engine with a vertical output shaft, said engine disposed between said pair of rear wheels, and said vertical output shaft projecting below said engine;
a hydraulic transmission for driving said rear wheels disposed to the rear of said engine;
first and second output pulleys drivingly connected to said vertical output shaft;
a transmission input pulley drivingly connected to said hydraulic transmission;
a belt drivingly engaged with said first output pulley and said transmission input pulley so that said first output pulley drives said tranmission input pulley;
a working device input pulley driven by said second output pulley and drivingly connected to said working device.

22. A power transmission according to claim 21, further comprising:
an axle casing disposed below and to the rear of said engine; and
a pair of axles disposed within said axle casing on which said rear wheels are mounted;
wherein said axles are driven by said hydraulic transmission.

23. A power transmission according to claim 22, wherein:
said hydraulic transmission comprises a hydraulic pump hydraulically connected to a hydraulic motor within said axle casing; and
said hydraulic pump and said hydraulic motor are arranged adjacent to said axles in said axle casing.

24. A power transmission according to claim 23, further comprising:
a motor shaft of said hydraulic motor; and
means to directly connect said motor shaft to a differential gear for differential driving said axles;

wherein said hydraulic motor has a larger capacity than said hydraulic pump.

25. A power transmission according to claim 22, further comprising:

a chamber disposed within said axle casing for housing said hydraulic transmission, wherein said chamber is filled with oil; and means for accommodating expansion in the volume of said oil.

* * * * *